US008848557B2

(12) United States Patent
Nam et al.

(10) Patent No.: US 8,848,557 B2
(45) Date of Patent: Sep. 30, 2014

(54) MULTIPLEXING OF CONTROL AND DATA IN UL MIMO SYSTEM BASED ON SC-FDM

(75) Inventors: Young-Han Nam, Richardson, TX (US); Jin-Kyu Han, Allen, TX (US); Jianzhong Zhang, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 184 days.

(21) Appl. No.: 13/214,936

(22) Filed: Aug. 22, 2011

(65) Prior Publication Data

US 2012/0051245 A1 Mar. 1, 2012

Related U.S. Application Data

(60) Provisional application No. 61/377,057, filed on Aug. 25, 2010, provisional application No. 61/380,104, filed on Sep. 3, 2010, provisional application No. 61/392,847, filed on Oct. 13, 2010.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 1/16* (2006.01)
*H04L 1/18* (2006.01)
*H04L 27/26* (2006.01)
*H04L 5/00* (2006.01)
*H04L 25/03* (2006.01)

(52) U.S. Cl.
CPC ............ *H04L 1/1861* (2013.01); *H04L 1/1671* (2013.01); *H04L 27/2636* (2013.01); *H04L 5/0053* (2013.01); *H04L 25/03929* (2013.01); *H04L 1/1812* (2013.01); *H04L 5/0055* (2013.01)
USPC ............ 370/252; 370/241; 370/319; 370/329

(58) Field of Classification Search
CPC ... H04L 5/0053; H04L 5/0055; H04L 1/0026; H04L 5/0057; H04L 1/1861; H04W 72/0413; H04W 72/04; H04W 72/0406; H04W 72/042; H04W 72/0446

USPC ......... 370/203, 208, 241, 252, 281, 295, 310, 370/319–321, 329–330, 334, 342–344, 431, 370/464
See application file for complete search history.

(56) References Cited

U.S. PATENT DOCUMENTS

| | | | | |
|---|---|---|---|---|
| 2012/0113831 | A1* | 5/2012 | Pelletier et al. | 370/252 |
| 2012/0120817 | A1* | 5/2012 | Khoshnevis et al. | 370/252 |
| 2012/0127950 | A1* | 5/2012 | Chung et al. | 370/329 |

(Continued)

FOREIGN PATENT DOCUMENTS

| | | |
|---|---|---|
| JP | 2010-114681 | 5/2010 |
| KR | 1020090085548 A | 8/2009 |

OTHER PUBLICATIONS

Written Opinion of the International Searching Authority dated Mar. 27, 2012 in connection with International Patent Application No. PCT/KR2011/006290.

(Continued)

*Primary Examiner* — Awet Haile
*Assistant Examiner* — Eric Myers (57) ABSTRACT

In a wireless network that operates according to the Long-Term Evolution Advanced standard, a mobile station determines a number of resource elements to be used for HARQ-ACK (hybrid automatic-repeat-request acknowledgement information) or RI (rank indication) on a MIMO (multiple-input multiple-output) PUSCH (physical uplink shared channel). In an embodiment, the mobile station determines a number O of bits in a payload for HARQ-ACK or RI. When the payload O is within a first range, the mobile station determines a minimum number $Q_{min}$ of resource elements to be used according to a first equation. When the payload O is within a second range, the mobile station determines the minimum number $Q_{min}$ of resource elements to be used according to a second equation. The mobile station then determines the number Q' of resource elements according to $Q_{min}$ and a third equation.

32 Claims, 6 Drawing Sheets

(56) References Cited

U.S. PATENT DOCUMENTS

| | | | |
|---|---|---|---|
| 2012/0327884 A1* | 12/2012 | Seo et al. | 370/329 |
| 2013/0028192 A1* | 1/2013 | Cheng et al. | 370/328 |
| 2013/0064212 A1* | 3/2013 | Ogawa et al. | 370/329 |
| 2013/0064228 A1* | 3/2013 | Jang et al. | 370/335 |

OTHER PUBLICATIONS

International Search Report dated Mar. 27, 2012 in connection with International Patent Application No. PCT/KR2011/006290.

"3rd Generation Partnership Project; Technical Specification Group Radio Access Network; Further advancements for E-UTRA; LTE-Advanced feasibility studies in RAN WG4 (Release 9)", 3GPP TR 36.815 v9.1.0, Jun. 2010, 29 pages.

"3rd Generation Partnership Project; Technical Specification Group Radio Access Network; Evolved Universal Terrestrial Radio Access (E-UTRA); Physical layer procedures (Release 9)", 3GPP TS 36.213 v9.2.0, Jun. 2010, 80 pages.

* cited by examiner

MULTIPLEXING OF CONTROL AND DATA IN UL MIMO SYSTEM BASED ON SC-FDM

CROSS-REFERENCE TO RELATED APPLICATION(S) AND CLAIM OF PRIORITY

The present application is related to U.S. Provisional Patent Application No. 61/377,057, filed Aug. 25, 2010, entitled "MULTIPLEXING OF CONTROL AND DATA IN UL MIMO SYSTEM BASED ON SC-FDM", U.S. Provisional Patent Application No. 61/380,104, filed Sep. 3, 2010, entitled "MULTIPLEXING OF CONTROL AND DATA IN UL MIMO SYSTEM BASED ON SC-FDM" and U.S. Provisional Patent Application No. 61/392,847, filed Oct. 13, 2010, entitled "MULTIPLEXING OF CONTROL AND DATA IN UL MIMO SYSTEM BASED ON SC-FDM". Provisional Patent Applications Nos. 61/377,057, 61/380,104 and 61/392,847 are assigned to the assignee of the present application and are hereby incorporated by reference into the present application as if fully set forth herein. The present application hereby claims priority under 35 U.S.C. §119(e) to U.S. Provisional Patent Applications Nos. 61/377,057, 61/380,104 and 61/392,847.

TECHNICAL FIELD OF THE INVENTION

The present application relates generally to wireless communication and, more specifically, to method and apparatus for multiplexing of control and data in uplink MIMO (multiple-input multiple-output) systems.

BACKGROUND OF THE INVENTION

The following documents and standards descriptions are hereby incorporated into the present disclosure as if fully set forth herein: i) 3GPP Technical Specification No. 36.211, version 8.5.0, "E-UTRA, Physical Channels And Modulation", December 2008 (hereinafter "REF1"); ii) 3GPP Technical Specification No. 36.212, version 8.5.0, "E-UTRA, Multiplexing And Channel coding", December 2008 (hereinafter "REF2"); iii) 3GPP Technical Specification No. 36.213, version 8.5.0, "E-UTRA, Physical Layer Procedures", December 2008 (hereinafter "REF3"); iv) U.S. Provisional Patent No. 61/206,455, filed Jan. 30, 2009, and entitled "Uplink Data And Control Signal Transmission In MIMO Wireless Systems" and U.S. patent application Ser. No. 12/641,951, filed on Dec. 18, 2009, and entitled "System And Method For Uplink Data And Control Signal Transmission In MIMO Wireless Systems" (hereinafter "REF4"); 3GPP Technical Specification No. 36.814, "Further Advancements For E-UTRA Physical Layer Aspects" (hereinafter "REF5"); 3GPP RAN1 #61 Chairman's notes (hereinafter "REF6"); 3GPP RAN1 #61bis Chairman's notes (hereinafter "REF7"); and 3GPP TDOC R1-104971 (hereinafter "REF8").

Multiplexing of control and data signals are discussed in Release 8 (Rel-8) of the 3GPP Standard in the Long Term Evolution (LTE) references REF1, REF2 and REF3 above. For example, data and control multiplexing may be achieved in the single-carrier frequency division multiple access (SC-FDMA) uplink transmission from a mobile station to a base station. The base station de-multiplexes the data and control information to determine the characteristics of the channel from the mobile station to the base station. In the 3GPP LTE standard, the uplink transmission includes only one layer.

However, in Release 10 of the Long Term Evolution Advanced (LTE-A) standard, which is a candidate 4G system to be incorporated in the 3GPP LTE standard, uplink multiple-input multiple-output (UL MIMO) spatial multiplexing (SM) is introduced, which allows multiple codewords to be split across multiple layers.

Therefore, there is a need in the art for improved apparatuses and methods for multiplexing of control and data in the uplink from a mobile station to a base station in a MIMO system.

SUMMARY OF THE INVENTION

For use in a wireless network that operates according to the Long-Term Evolution Advanced standard, a method for determining a number of resource elements to be used for HARQ-ACK (hybrid automatic-repeat-request acknowledgement information) or RI (rank indication) on a MIMO (multiple-input multiple-output) PUSCH (physical uplink shared channel) is provided. The method includes determining a number O of bits in a payload for HARQ-ACK or RI. The method also includes, when the payload O is within a first range, determining a minimum number $Q_{min}$ of resource elements to be used for HARQ-ACK or RI according to a first equation. The method further includes, when the payload O is within a second range, determining the minimum number $Q_{min}$ of resource elements to be used for HARQ-ACK or RI according to a second equation. The method still further includes determining the number Q' of resource elements according to $Q_{min}$ and a third equation. The method also includes assigning the Q' resource elements for HARQ-ACK or RI. The method further includes multiplexing the HARQ-ACK or RI resource elements with a plurality of data resource elements in the PUSCH.

A mobile station configured to perform the disclosed method is also provided.

For use in a wireless network that operates according to the Long-Term Evolution Advanced standard, a method for receiving resource elements for HARQ-ACK or RI on a MIMO PUSCH from a mobile station is provided. The method includes determining a number O of bits in a payload for HARQ-ACK or RI. The method also includes, when the payload O is within a first range, determining a minimum number $Q_{min}$ of resource elements to be used for HARQ-ACK or RI according to a first equation. The method further includes, when the payload O is within a second range, determining the minimum number $Q_{min}$ of resource elements to be used for HARQ-ACK or RI according to a second equation. The method still further includes determining a number Q' of resource elements according to $Q_{min}$ and a third equation. The method also includes receiving the PUSCH from the mobile station, the PUSCH comprising Q' resource elements for HARQ-ACK or RI multiplexed with a plurality of data resource elements.

A base station configured to perform the disclosed method is also provided.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
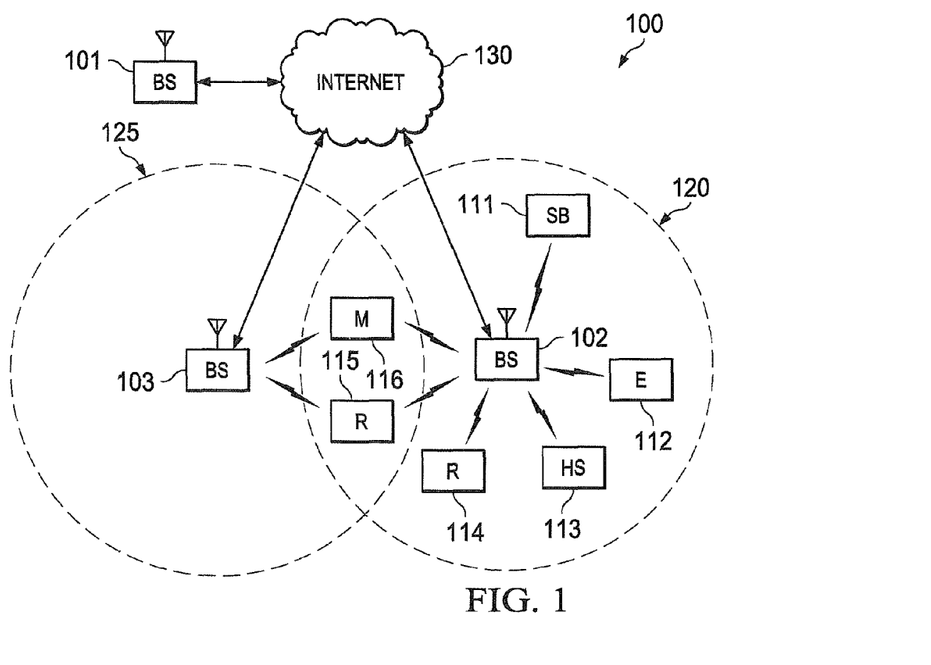
FIG. 1 illustrates an exemplary wireless network, which transmits uplink sounding reference signals (SRS) according to an embodiment of the present disclosure.

FIG. 1 illustrates exemplary wireless network 100, which transmits uplink sounding reference signals (SRS) according to an embodiment of the present disclosure. Wireless network 100 includes base station (BS) 101, base station (BS) 102, base station (BS) 103, and other similar base stations (not shown). Base station 101 is in communication with Internet 130 or a similar IP-based network (not shown).

Depending on the network type, other well-known terms may be used instead of "base station," such as "eNodeB" or "access point". For the sake of convenience, the term "base station" shall be used herein to refer to the network infrastructure components that provide wireless access to remote terminals.

Base station 102 provides wireless broadband access to Internet 130 to a first plurality of mobile stations within coverage area 120 of base station 102. The first plurality of subscriber stations includes mobile station 111, which may be located in a small business (SB), mobile station 112, which may be located in an enterprise (E), mobile station 113, which may be located in a WiFi hotspot (HS), mobile station 114, which may be located in a first residence (R), mobile station 115, which may be located in a second residence (R), and mobile station 116, which may be a mobile device (M), such as a cell phone, a wireless laptop, a wireless PDA, or the like.

For the sake of convenience, the term "mobile station" is used herein to designate any remote wireless equipment that wirelessly accesses a base station, whether or not the mobile station is a truly mobile device (e.g., cell phone) or is normally considered a stationary device (e.g., desktop personal computer, vending machine, etc.). In other systems, other well-known terms may be used instead of "mobile station", such as "subscriber station (SS)", "remote terminal (RT)", "wireless terminal (WT)", "user equipment (UE)", and the like.

Base station 103 provides wireless broadband access to Internet 130 to a second plurality of mobile stations within coverage area 125 of base station 103. The second plurality of mobile stations includes mobile station 115 and mobile station 116. In an exemplary embodiment, base stations 101-103 may communicate with each other and with mobile stations 111-116 using OFDM or OFDMA techniques.

While only six mobile stations are depicted in FIG. 1, it is understood that wireless network 100 may provide wireless broadband access to additional mobile stations. It is noted that mobile station 115 and mobile station 116 are located on the edges of both coverage area 120 and coverage area 125. Mobile station 115 and mobile station 116 each communicate with both base station 102 and base station 103 and may be said to be operating in handoff mode, as known to those of skill in the art.

The use of multiple transmit antennas and multiple receive antennas at both a base station and a single mobile station to improve the capacity and reliability of a wireless communication channel is known as a Single User Multiple-Input, Multiple-Output (SU-MIMO) system. A MIMO system provides a linear increase in capacity with K, where K is the minimum of the number of transmit antennas (M) and receive antennas (N) (i.e., K=min(M,N)). A MIMO system can be implemented with the schemes of spatial multiplexing, transmit and receive beamforming, or transmit and receive diversity.

Figure 2:
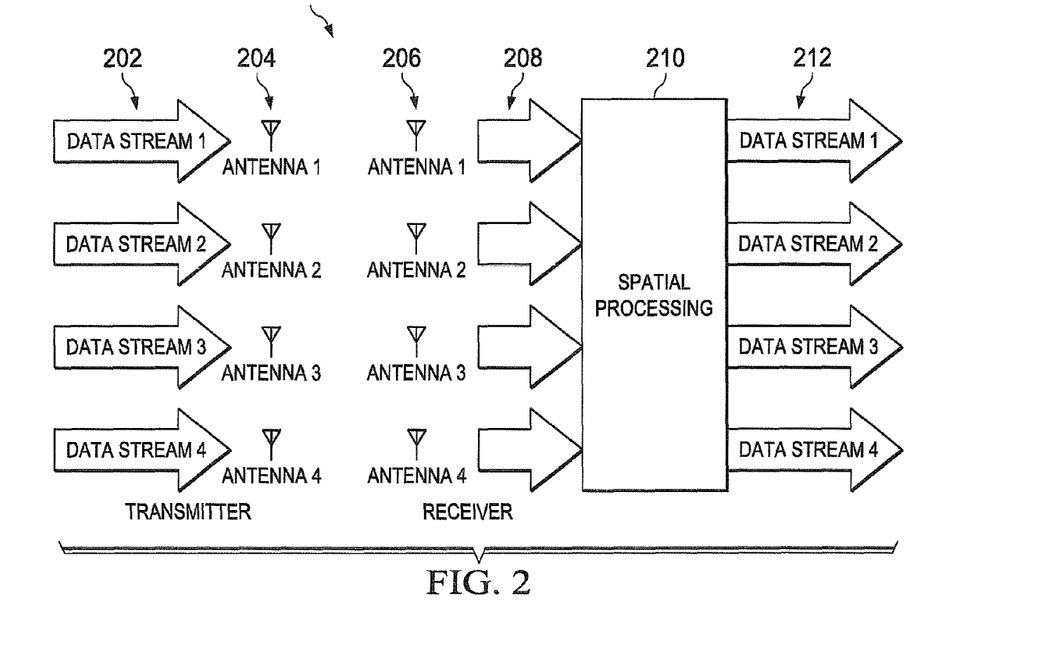
FIG. 2 illustrates a 4×4 multiple-input, multiple-output (MIMO) system according to an embodiment of the present disclosure.

FIG. 2 illustrates a 4×4 multiple-input, multiple-output (MIMO) system 200 according to an embodiment of the present disclosure. In this example, four different data streams 202 are transmitted separately using four transmit antennas 204. The transmitted signals are received at four receive antennas 206 and interpreted as received signals 208. Some form of spatial signal processing 210 is performed on the received signals 208 in order to recover four data streams 212.

An example of spatial signal processing is Vertical-Bell Laboratories Layered Space-Time (V-BLAST), which uses the successive interference cancellation principle to recover the transmitted data streams. Other variants of MIMO schemes include schemes that perform some kind of space-time coding across the transmit antennas (e.g., Diagonal Bell Laboratories Layered Space-Time (D-BLAST)). In addition, MIMO can be implemented with a transmit and receive diversity scheme and a transmit and receive beamforming scheme to improve the link reliability or system capacity in wireless communication systems.

Figure 3:
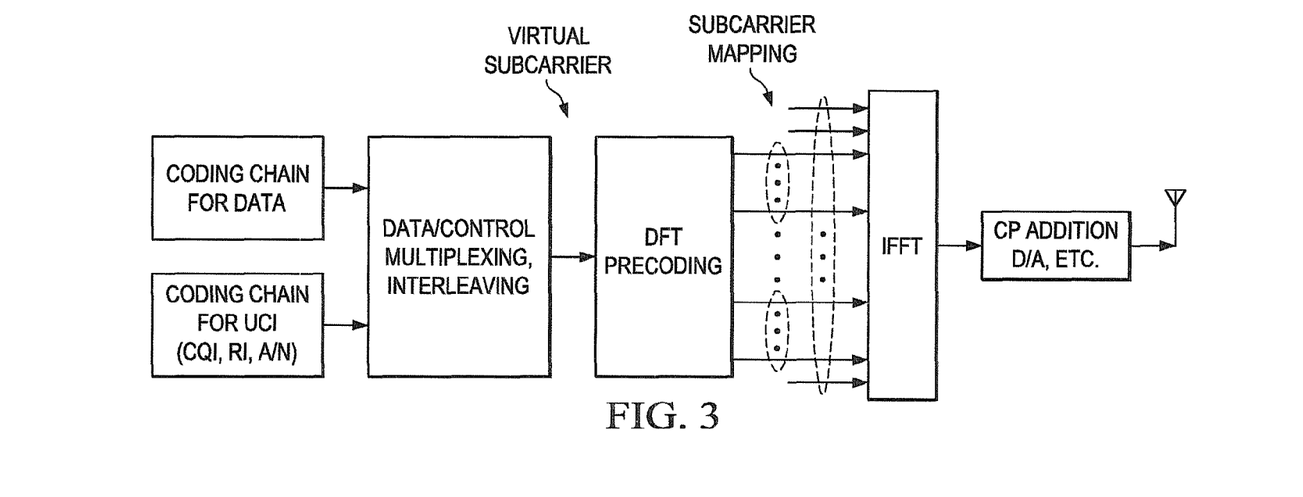
FIG. 3 illustrates single-carrier frequency division multiple access (SC-FDMA) uplink (UL) transmission of a data channel physical uplink shared channel (PUSCH)

Single-carrier frequency division multiple access (SC-FDMA) uplink (UL) transmission of the data channel physical uplink shared channel (PUSCH) is specified in references REF1 and REF2 for the 3GPP LTE system and is illustrated in FIG. 3. As shown in FIG. 3, the subcarrier mapping step maps the output of the DFT (Discrete Fourier Transformation) precoder to a contiguous set of subcarriers at the input of the IFFT (Inverse Fast Fourier Transform). Typically the size of the IFFT is greater than the size of DFT precoder. In the 3GPP LTE standard, the uplink transmission has only one layer.

Figure 4:
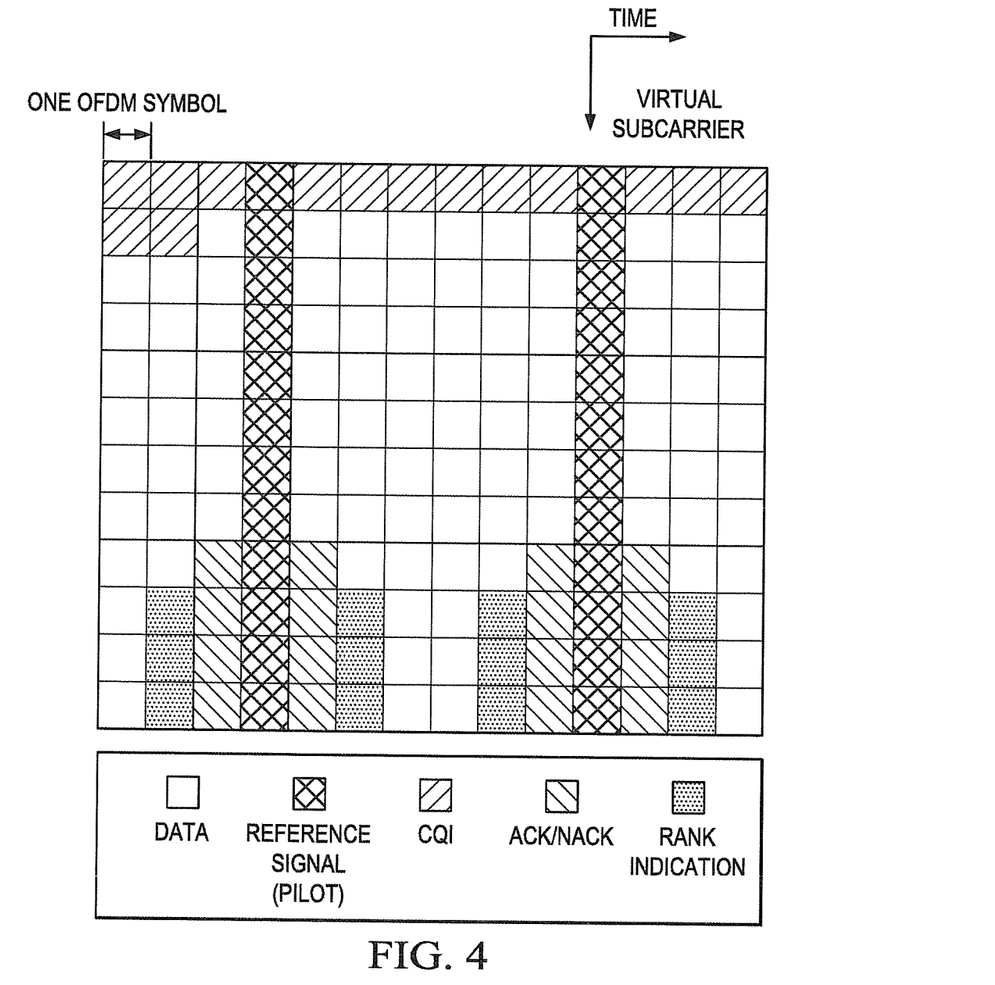
FIG. 4 illustrates a graphical representation of a data/control multiplexing function in an UL transmission.
Figure 5:
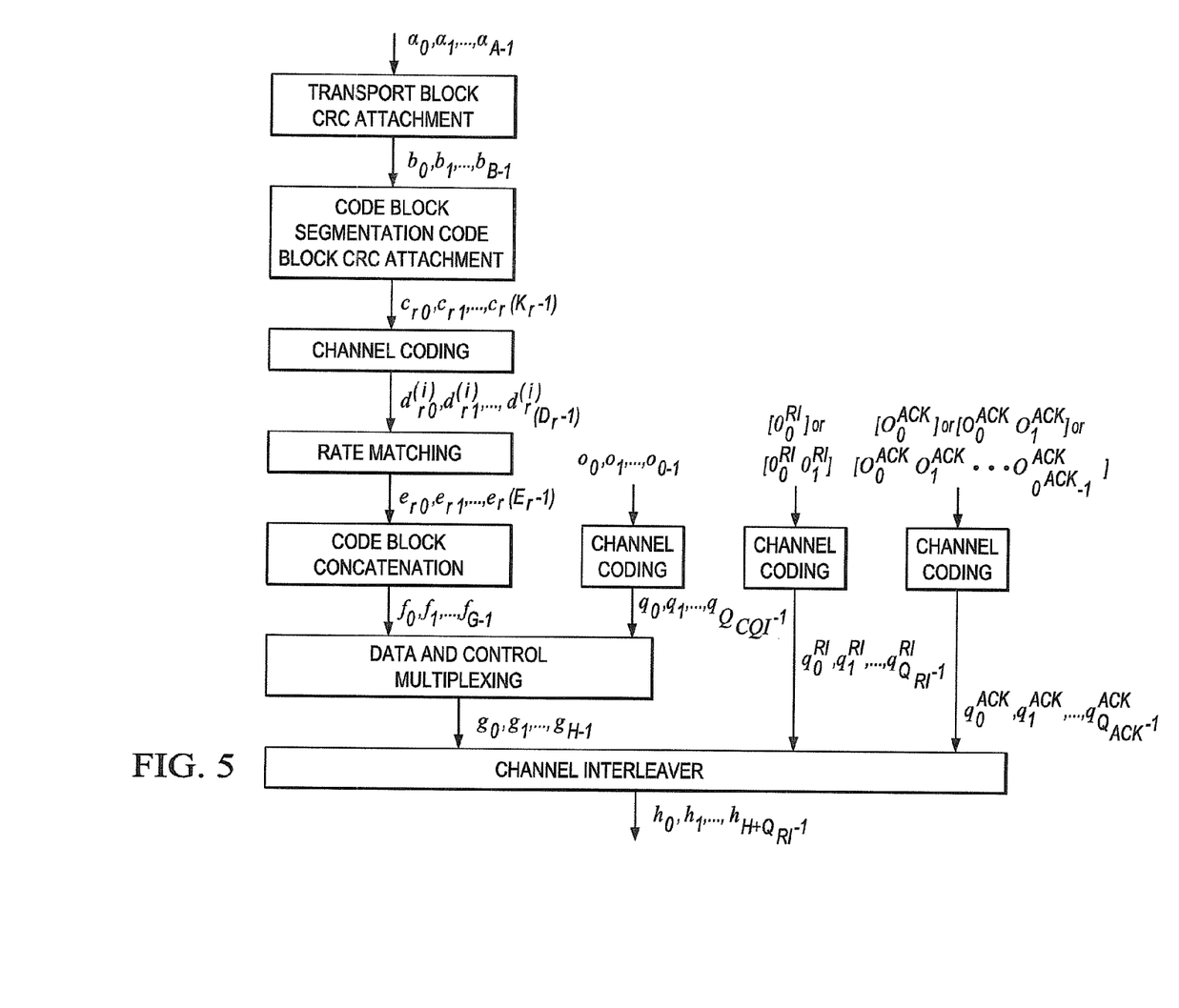
FIG. 5 illustrates coding steps for an UL-SCH transport channel in 3GPP LTE releases 8 and 9.
Figure 6:
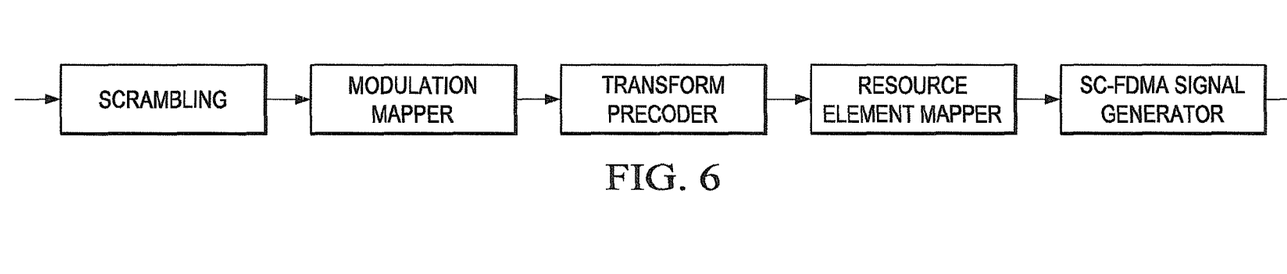
FIG. 6 illustrates an overview of UL physical channel processing in 3GPP LTE releases 8 and 9.

One of the key components of this uplink transmission is the data/control multiplexing function, which is described in REF2. FIG. 4 illustrates a graphical representation of the data/control multiplexing function. In the two dimensional grid shown in FIG. 4, the output across all virtual subcarriers at a given OFDM symbol in time is collected and send to the DFT precoder, such as shown in FIG. 3.

The current codeword to layer mapping structure for UL MIMO transmission, as described in REF5, is agreed to be the same as the DL MIMO transmission in REF1, which is shown in TABLE 1 below.

UCI symbol-level layer mapping: same as (or treated as a part of) data.
UCI refers to at least one of HARQ-ACK, RI, CQI/PMI.

Figure 7:
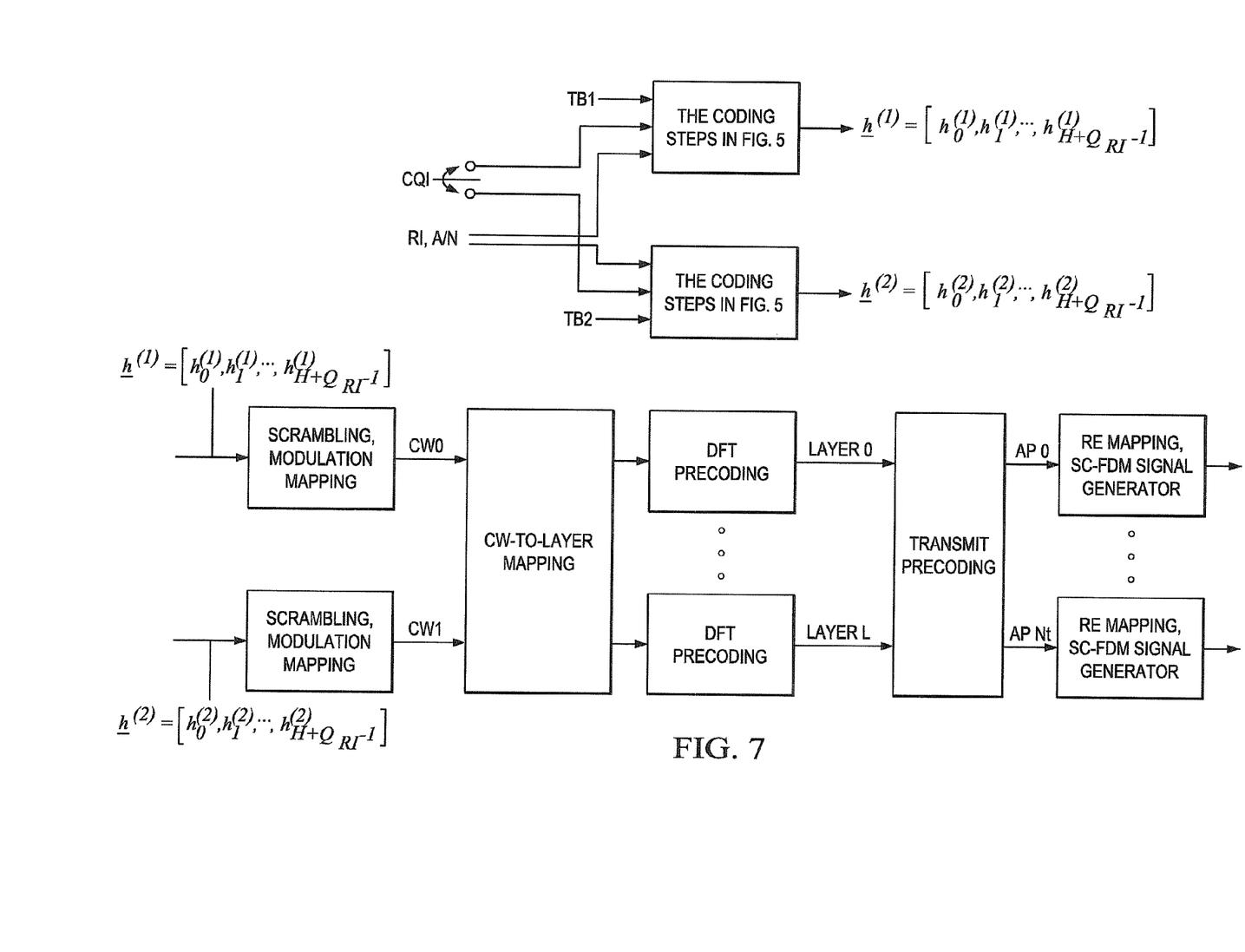
FIG. 7 illustrates a transmission chain that utilizes two codewords in an UL multiple-input multiple-output (MIMO) spatial multiplexing (SM) transmission.

As described in LTE-A Release 10, UL MIMO SM permits transmission using up to two codewords. FIG. 7 illustrates a transmission chain that utilizes two codewords. When two codewords are to be transmitted in a subframe, two bit-streams $\underline{h}^{(1)}$ and $\underline{h}^{(2)}$ for the two codewords are separately generated according to the coding steps in FIG. 5, where $\underline{h}^{(q)} = [h_0^{(q)}, h_1^{(q)}, \ldots, h_{H+Q_{RI}-1}^{(q)}]$ and $q \in \{1,2\}$. The two inputs from the coding steps are processed separately through scrambling and modulation mapping. The output of a modulation mapping block is a codeword. Up to two codewords are input to the codeword-to-layer mapping block whose outputs are layers, which are L modulation symbol streams. Then, each of the modulation symbol streams is input to a transform

TABLE 1

Codeword-to-layer mapping for spatial multiplexing

| Comment | Number of layers | Number of code words | Codeword-to-layer mapping $i = 0, 1, \ldots, M_{symb}^{layer} - 1$ |
|---|---|---|---|
| CW0 to layer 0 | 1 | 1 | $x^{(0)}(i) = d^{(0)}(i)$ $M_{symb}^{layer} = M_{symb}^{(0)}$ |
| CW0 to layer 0 CW1 to layer 1 | 2 | 2 | $x^{(0)}(i) = d^{(0)}(i)$ $M_{symb}^{layer} = M_{symb}^{(0)} = M_{symb}^{(1)}$ $x^{(1)}(i) = d^{(1)}(i)$ |
| CW0 to layer 0 & 1 | 2 | 1 | $x^{(0)}(i) = d^{(0)}(2i)$ $M_{symb}^{layer} = M_{symb}^{(0)}/2$ $x^{(1)}(i) = d^{(0)}(2i+1)$ |
| CW0 to layer 0, CW1 to layer 1 & 2 | 3 | 2 | $x^{(0)}(i) = d^{(0)}(i)$ $M_{symb}^{layer} = M_{symb}^{(0)} = M_{symb}^{(1)}/2$ $x^{(1)}(i) = d^{(1)}(2i)$ $x^{(2)}(i) = d^{(1)}(2i+1)$ |
| CW0 to layer 0 & 1 CW1 to layer 2 & 3 | 4 | 2 | $x^{(0)}(i) = d^{(0)}(2i)$ $M_{symb}^{layer} = M_{symb}^{(0)}/2 = M_{symb}^{(1)}/2$ $x^{(1)}(i) = d^{(0)}(2i+1)$ $x^{(2)}(i) = d^{(1)}(2i)$ $x^{(3)}(i) = d^{(1)}(2i+1)$ |

In 3GPP LTE Releases 8 and 9, a mobile station may transmit up to one codeword in a subframe. Coding steps for the uplink data (UL-SCH) transport channel are described in FIG. 5, which is reproduced from REF2. Uplink physical channel processing is described in FIG. 6, which is reproduced from REF1. It is noted that an output from FIG. 5 becomes an input to FIG. 6.

In 3GPP LTE-A Release 10, UL MIMO spatial multiplexing (SM) is introduced. When a mobile station is scheduled to transmit signals in a subframe using a UL-MIMO SM scheme in LTE-A, the mobile station can transmit up to two codewords (CWs) in the subframe.

In REF6, the following details are agreed for control and data multiplexing in UL MIMO:

HARQ-ACK (hybrid automatic-repeat-request acknowledgement information) and RI (rank indication):
  Replicated across all layers of both codewords;
  TDM multiplexed with data such that UCI (uplink control information) symbols are time-aligned across all layers;
CQI/PMI (channel quality information/precoding matrix information):
  Transmitted only on 1 codeword;
  Reuse Release 8 multiplexing and channel interleaving mechanisms;
  Extension: The input to data-control multiplexing $\{q_0, q_1, q_2, q_3, \ldots, q_{Q_{CQI}-1}, f_0, f_1, f_2, f_3, \ldots, f_{G-1}\}$ is grouped into column vectors $\underline{g}_0, \underline{g}_1, \underline{g}_2, \underline{g}_3, \ldots, \underline{g}_{H'-1}$ of length $Q\_m*L$, where L (1 or 2) is the number of layers the CW is mapped onto;
  Enable time for resource element (RE) alignment across 2 layers for L=2;

(or DFT) precoder, and the outputs of the DFT precedes are input to the transmit precoding block. The transmit precoding block generates $N_t$ modulation symbols streams, each of which is transmitted in a transmit antenna port.

In REF7, the following details are agreed and documented regarding the numbers of UCI resource elements (REs) when the UCI is multiplexed on the UL MIMO PUSCH.

Determination of the HARQ and RI Resource Size:
  A first alternative, Alternative 1, described below, is considered to be a baseline assumption.
  The number of resources per layer is given by Alternative 1 or a second alternative, Alternative 2:
    Alternative 1: If a single beta value is agreed, a simple extension of the Release 8 equation is applicable:

$$Q' = \min\left\{ \left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH} \right\}$$

If multiple beta values are agreed, the equation can be further adapted to account for the multiple beta values.
    Alternative 2: This equation is a further optimization for high-payload cases:

$$Q'_{RI} = \min\left( \left\lceil \max\left( \frac{Q_{all}}{K^{(0)} + K^{(1)} + \alpha_{RI}}, \frac{1}{S_{max}} \right) \cdot \beta_{offset}^{RI} \cdot O^{RI} \right\rceil, Q'_{max,RI} \right)$$

-continued $$Q'_{HARQ-ACK} = \min\left(\left\lceil \max\left(\frac{Q_{all}}{K^{(0)} + K^{(1)} + \alpha_{HARQ-ACK}}, \frac{1}{S_{max}}\right) \cdot \beta_{offset}^{HARQ-ACK} \cdot O^{HARQ-ACK} \right\rceil, Q'_{max,HARQ-ACK}\right)$$

Determination of the CQI/PMI Resource Size:
A first alternative, Alternative 1, described below, is considered to be a baseline assumption.
The number of resources per layer is given by Alternative 1 or a second alternative, Alternative 2:
  Alternative 1: If a single beta value is agreed, a simple extension of the Release 8 equation is applicable:

$$Q' = \min\left\{\left\lceil \frac{(O+L) \cdot M_{sc}^{PUSCH-initial} \cdot N_{symb}^{PUSCH-initial} \cdot \beta_{offset}^{CQI}}{\sum_{r=0}^{C^{(x)}-1} K_r^{(x)}} \right\rceil, M_{sc}^{PUSCH} \cdot N_{symb}^{PUSCH} - Q'_{RI}\right\}$$

If multiple beta values are agreed, the equation can be further adapted to account for the multiple beta values.

Alternative 2: This equation is a further optimization for high-payload cases:

$$Q'_{CQI} = \min\left(\left\lceil \frac{Q_{all} - Q'_{RI}}{K^{(k_{CQI})} + \alpha_{CQI}} \cdot \beta_{offset}^{CQI} \cdot (O^{CQI} + L) \right\rceil, Q'_{max,CQI}\right)$$

Channel Coding for CQI

The following description of channel coding for CQI is further described in section 5.2.2.6.4 in REF2.

The channel quality bits input to the channel coding block are denoted by $o_0, o_1, o_2, o_3, \ldots, o_{O-1}$, where O is the number of bits. The number of channel quality bits depends on the transmission format. When the Physical Uplink Control Channel (PUCCH)-based reporting format is used, the number of CQI/PMI bits is defined in section 5.2.3.3.1 of REF2 for wideband reports, and in section 5.2.3.3.2 of REF2 for mobile station selected subbands reports. When the PUSCH-based reporting format is used, the number of CQI/PMI bits is defined in section 5.2.2.6.1 of REF2 for wideband reports, in section 5.2.2.6.2 of REF2 for higher layer configured subbands reports, and in section 5.2.2.6.3 of REF2 for mobile station selected subbands reports.

The channel quality information is first coded using a (32, O) block code. The codewords of the (32, O) block code are a linear combination of the eleven (11) basis sequences denoted $M_{i,n}$ and defined in Table 5.2.2.6.4-1 of REF2, which is reproduced as TABLE 2 below.

TABLE 2

Basis sequences for (32, O) code.

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 0 | 1 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

The encoded CQI/PMI block is denoted by $b_0, b_1, b_2, b_3, \ldots, b_{B-1}$ where B=32 and $$b_i = \sum_{n=0}^{O-1} (o_n \cdot M_{i,n}) \bmod 2 \text{ where } i = 0, 1, 2, \ldots, B-1.$$

The output bit sequence $q_0, q_1, q_2, q_3, \ldots, q_{QCQI-1}$ is obtained by circular repetition of the encoded CQI/PMI block as follows $q_i = b_{(i \bmod B)}$ where $i=0, 1, 2, \ldots, QCQI-1$.

A draft CR for REF2 presented in REF8 describes a proposal for UCI multiplexing on the MIMO PUSCH, portions of which are reproduced below.

Channel Coding of Control Information

Control data arrives at the coding unit in the form of channel quality information (CQI and/or PMI), HARQ-ACK and rank indication. Different coding rates for the control information are achieved by allocating different numbers of coded symbols for its transmission. When control data is transmitted in the PUSCH, the channel coding for HARQ-ACK, rank indication and channel quality information $o_0, o_1, o_2, \ldots, o_{O-1}$ is done independently.

For TDD (time division duplex), two HARQ-ACK feedback modes are supported by higher layer configuration: HARQ-ACK bundling and HARQ-ACK multiplexing.

For TDD HARQ-ACK bundling, the HARQ-ACK consists of one or two bits of information. For TDD HARQ-ACK multiplexing, the HARQ-ACK consists of between one and four bits of information, where the number of bits is determined as described in section 7.3 of REF3.

When the mobile station transmits the HARQ-ACK bits or rank indicator bits, the mobile station determines the number of coded modulation symbols Q' for the HARQ-ACK or rank indicator as $$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right)$$

where $$\sum_{r=0}^{C^{(0)}-1} K_r^{(0)} + \sum_{r=0}^{C^{(1)}-1} K_r^{(1)}$$

represents the transport block (TB) size, O is the number of HARQ-ACK bits or rank indicator bits, $M_{sc}^{PUSCH}$ is the scheduled bandwidth for PUSCH transmission in the current subframe for the transport block (expressed as a number of subcarriers in REF2), and $N_{symb}^{PUSH-initial}$ is the number of SC-FDMA symbols per subframe for the initial PUSCH transmission for the same transport block given by $N_{symb}^{PUSH-initial} = (2 \cdot (N_{symb}^{UL}-1)-N_{SRS})$, where $N_{SRS}$ is equal to 1 if the mobile station is configured to send the PUSCH and SRS in the same subframe for initial transmission or if the PUSCH resource allocation for initial transmission even partially overlaps with the cell-specific SRS subframe and bandwidth configuration defined in section 5.5.3 of REF2. Otherwise $N_{SRS}$ is equal to 0. $M_{sc}^{PUSCH-initial}$, C, and $K_r^{(x)}$, x={0,1} are obtained from the initial PDCCH for the same transport block. If there is no initial PDCCH with downlink control information (DCI) format 0 or 4 for the same transport block, $M_{sc}^{PUSCH-initial}$, C, and $K_r^{(x)}$, x={0,1} are determined according to one of the following two options:

the most recent semi-persistent scheduling assignment PDCCH, when the initial PUSCH for the same transport block is semi-persistently scheduled; or the random access response grant for the same transport block, when the PUSCH is initiated by the random access response grant.

The HARQ-ACK is determined according to the following:

$Q_{ACK} = Q_m \cdot Q'$ and $[\beta_{offset}^{PUSCH} = \beta_{offset}^{HARQ-ACK}]$, where $Q_m$ is the modulation order and $\beta_{offset}^{HARQ-ACK}$ is determined according to the description in REF3.

The rank indication is determined according to the following:

$Q_{RI} = Q_m \cdot Q'$ and $[\beta_{offset}^{PUSCH} = \beta_{offset}^{RI}]$, where $Q_m$ is the modulation order and $\beta_{offset}^{RI}$ is determined according to the description in REF3.

For the HARQ-ACK, each positive acknowledgement (ACK) is encoded as a binary '1' and each negative acknowledgement (NACK) is encoded as a binary '0'. If the HARQ-ACK feedback consists of one (1) bit of information, e.g., $[o_0^{ACK}]$, the HARQ-ACK is first encoded according to the modulation order $Q_m$, as shown in TABLE 3 below.

If the HARQ-ACK feedback consists of two (2) bits of information (e.g., $[o_0^{ACK} o_1^{ACK}]$ with $o_0^{ACK}$ corresponding to the HARQ-ACK bit for codeword 0 and $o_1^{ACK}$ corresponding to the HARQ-ACK for codeword 1), the HARQ-ACK is first encoded according to TABLE 4 where $o_2^{ACK} = (o_0^{ACK} + \text{Ohm } 1^{ACK}) \bmod 2$.

TABLE 3

Encoding of 1-bit HARQ-ACK

| $Q_m$ | Encoded HARQ-ACK |
|---|---|
| 2 | $[o_0^{ACK} y]$ |
| 4 | $[o_0^{ACK} y \, x \, x]$ |
| 6 | $[o_0^{ACK} y \, x \, x \, x \, x]$ |

TABLE 4

Encoding of 2-bit HARQ-ACK

| $Q_m$ | Encoded HARQ-ACK |
|---|---|
| 2 | $[o_0^{ACK} o_1^{ACK} o_2^{ACK} o_0^{ACK} o_1^{ACK} o_2^{ACK}]$ |
| 4 | $[o_0^{ACK} o_1^{ACK} x \, x \, o_2^{ACK} o_0^{ACK} x \, x \, o_1^{ACK} o_2^{ACK} x \, x]$ |
| 6 | $[o_0^{ACK} o_1^{ACK} x \, x \, x \, x \, o_2^{ACK} o_0^{ACK} x \, x \, x \, x \, o_1^{ACK} o_2^{ACK} x \, x \, x \, x]$ |

If the HARQ-ACK feedback consists of $3 \leq O^{ACK} \leq 11$ bits of information as a result of the aggregation of HARQ-ACK bits corresponding to multiple DL component carriers (e.g., $[o_0^{ACK} o_1^{ACK}, \ldots, o_{O^{ACK}-1}^{ACK}]$), then a coded bit sequence $[\tilde{q}_0^{ACK} \tilde{q}_1^{ACK}, \ldots, \tilde{q}_{O^{ACK}-1}^{ACK}]$ is obtained by using the bit sequence $[o_0^{ACK} o_1^{ACK}, \ldots, o_{O^{ACK}-1}^{ACK}]$ as the input to the channel coding block, as described in section 5.2.2.6.4 of REF2.

The "x" and "y" in TABLES 3 and 4 and the pseudo-code below are placeholders for scrambling the HARQ-ACK bits in a way that maximizes the Euclidean distance of the modulation symbols carrying HARQ-ACK information, as described in REF2.

For embodiments having FDD or TDD HARQ-ACK multiplexing, when the HARQ-ACK feedback consists of one or two bits of information, the bit sequence $q_0^{ACK}$, $q_1^{ACK}$, $q_2^{ACK}, \ldots, q_{Q_{ACK}-1}^{ACK}$ is obtained by concatenation of multiple encoded HARQ-ACK blocks where $Q_{ACK}$ is the total number of coded bits for all the encoded HARQ-ACK blocks. The last concatenation of the encoded HARQ-ACK block may be partial so that the total bit sequence length is equal to $Q_{ACK}$.

For embodiments having FDD or TDD HARQ-ACK multiplexing, when the HARQ-ACK feedback consists of three through eleven bits of information as a result of the aggregation of more than one DL component carrier, the coded bit sequence $[\tilde{q}_0^{ACK}, \tilde{q}_1^{ACK}, \ldots, \tilde{q}_{31}^{ACK}]$ is further encoded according to the following pseudo-code to generate the sequence $[\tilde{\tilde{q}}_0^{ACK} \tilde{\tilde{q}}_1^{ACK}, \ldots, \tilde{\tilde{q}}_{\hat{Q}_{ACK}-1}^{ACK}]$ with $\hat{Q}_{ACK}=32+16 \cdot (Q_m-2)$:

Set i=0
while i<16

$\tilde{\tilde{q}}_{Q_m \cdot i}^{ACK} = \tilde{q}_i^{ACK}$ $\tilde{\tilde{q}}_{Q_m \cdot i+1}^{ACK} = \tilde{q}_{i+1}^{ACK}$ if $Q_m=4$ $\tilde{\tilde{q}}_{Q_m \cdot i+2}^{ACK} = \tilde{\tilde{q}}_{Q_m \cdot i+3}^{ACK} = x$ else if $Q_m=6$ $\tilde{\tilde{q}}_{Q_m \cdot i+2}^{ACK} = \tilde{\tilde{q}}_{Q_m \cdot i+3}^{ACK} = \tilde{\tilde{q}}_{Q_m \cdot i+4}^{ACK} = \tilde{\tilde{q}}_{Q_m \cdot i+5}^{ACK} = x$ end if
i=i+1
end while which is circularly repeated to generate the sequence $q_0^{ACK}$, $q_1^{ACK}, q_2^{ACK}, \ldots, q_{Q_{ACK}-1}^{ACK}$ according to $q_i^{ACK} = \tilde{\tilde{q}}_{i \bmod \hat{Q}_{ACK}}^{ACK}$, i=0, \ldots, Q_{ACK}-1.

For embodiments having TDD HARQ-ACK bundling, a bit sequence $\tilde{q}_0^{ACK}, \tilde{q}_1^{ACK}, \tilde{q}_2^{ACK}, \ldots, \tilde{q}_{Q_{ACK}-1}^{ACK}$ is obtained by concatenation of multiple encoded HARQ-ACK blocks, where $Q_{ACK}$ is the total number of coded bits for all the encoded HARQ-ACK blocks. The last concatenation of the encoded HARQ-ACK block may be partial so that the total bit sequence length is equal to $Q_{ACK}$. A scrambling sequence $[w_0^{ACK} w_1^{ACK} w_2^{ACK} w_3^{ACK}]$ is then selected from TABLE 5 below according an index $i=(N_{bundled}-1) \bmod 4$, where $N_{bundled}$ is determined as described in section 7.3 of REF3. The bit sequence $q_0^{ACK}, q_1^{ACK}, q_2^{ACK}, \ldots, q_{Q_{ACK}-1}^{ACK}$ is then generated by setting m=1 if the HARQ-ACK consists of one bit and m=3 if the HARQ-ACK consists of two bits, and then scrambling $\tilde{q}_0^{ACK}, \tilde{q}_1^{ACK}, \tilde{q}_2^{ACK}, \ldots, \tilde{q}_{Q_{ACK}-1}^{ACK}$ according to the following pseudo-code:

Set i, k to 0
while i<$Q_{ACK}$
    if $\tilde{q}_i^{ACK}=y$ // place-holder repetition bit $q_i^{ACK}=(\tilde{q}_{i-1}^{ACK}+w_{\lfloor k/m \rfloor}^{ACK}) \bmod 2$ $k=(k+1) \bmod 4m$ else if $\tilde{q}_i^{ACK}=x$ // a place-holder bit $q_i^{ACK}=\tilde{q}_i^{ACK}$ else // coded bit $q_i^{ACK}=(\tilde{q}_i^{ACK}+w_{\lfloor k/m \rfloor}^{ACK}) \bmod 2$ $k=(k+1) \bmod 4m$ end if
    i=i+1
end while.

TABLE 5

Scrambling sequence selection for TDD HARQ-ACK bundling

| i | $[w_0^{ACK} w_1^{ACK} w_2^{ACK} w_3^{ACK}]$ |
|---|---|
| 0 | [1 1 1 1] |
| 1 | [1 0 1 0] |
| 2 | [1 1 0 0] |
| 3 | [1 0 0 1] |

For embodiments where the HARQ-ACK feedback consists of more than two bits of information (e.g., $[o_0^{ACK} o_1^{ACK} \Lambda o_{O^{ACK}-1}^{ACK}]$ with $o^{ACK}>2$), the bit sequence $q_0^{ACK}$, $q_1^{ACK}, q_2^{ACK}, \ldots, q_{Q_{ACK}-1}^{ACK}$ is obtained according to $$q_i^{ACK} = \sum_{n=0}^{O^{ACK}-1} (o_n^{ACK} \cdot M_{(i \bmod 32),n}) \bmod 2$$

where $i=0, 1, 2, \ldots, Q_{ACK}-1$, and the basis sequences $M_{i,n}$ are defined in TABLE 2.

The vector sequence output of the channel coding for the HARQ-ACK information is denoted by $\underline{q}_0^{ACK}, \underline{q}_1^{ACK}, \ldots, \underline{q}_{Q''_{ACK}-1}^{ACK}$ where $Q''_{ACK}=Q_{ACK}/(Q_m \cdot N_L)$. The vector sequence output may be obtained according to the following pseudo-code:

Set i,k to 0
while i<$Q_{ACK}$ $\underline{q}_k^{ACK}=[q_i^{ACK} \ldots q_{i+Q_m \cdot N_L-1}^{ACK}]^T$ $i=i+Q_m \cdot N_L$ $k=k+1$ end while
where $N_L$ is the number of layers onto which the UL-SCH transport block is mapped.

For the rank indication (RI), the corresponding bit widths for RI feedback for PDSCH transmissions are given by Tables 5.2.2.6.1-2, 5.2.2.6.2-3, 5.2.2.6.3-3, 5.2.3.3.1-3 and 5.2.3.3.2-4 in REF2. The bit widths are determined assuming the maximum number of layers according to the corresponding base station antenna configuration and mobile station category.

If the RI feedback consists of one bit of information (e.g., $[o_0^{RI}]$), the RI feedback is first encoded according to TABLE 6 below. The $[o_0^{RI}]$ to RI mapping is given by TABLE 8 below.

If the RI feedback consists of two bits of information (e.g., $[o_0^{RI} o_1^{RI}]$ with $o_0$RI corresponding to the MSB of the two-bit input and $o_1^{RI}$ corresponding to the LSB of the two-bit input), the RI feedback is first encoded according to TABLE 7 below, where $o_2^{RI}=(o_0^{RI}+o_1^{RI}) \bmod 2$. The $[o_0^{RI} o_1^{RI}]$ to RI mapping is given by TABLE 9 below.

TABLE 6

Encoding of 1-bit RI

| $Q_m$ | Encoded RI |
|---|---|
| 2 | $[o_0^{RI} y]$ |
| 4 | $[o_0^{RI} y x x]$ |
| 6 | $[o_0^{RI} y x x x x]$ |

TABLE 7

Encoding of 2-bit RI

| $Q_m$ | Encoded RI |
|---|---|
| 2 | $[o_0^{RI}\ o_1^{RI}\ o_2^{RI}\ o_0^{RI}\ o_1^{RI}\ o_2^{RI}]$ |
| 4 | $[o_0^{RI}\ o_1^{RI}\ x\ x\ o_2^{RI}\ o_0^{RI}\ x\ x\ o_1^{RI}\ o_2^{RI}\ x\ x]$ |
| 6 | $[o_0^{RI}\ o_1^{RI}\ x\ x\ x\ x\ o_2^{RI}\ o_0^{RI}\ x\ x\ x\ x\ o_1^{RI}\ o_2^{RI}\ x\ x\ x\ x]$ |

TABLE 8

$o_0^{RI}$ to RI mapping

| $o_0^{RI}$ | RI |
|---|---|
| 0 | 1 |
| 1 | 2 |

TABLE 9

$o_0^{RI}, o_1^{RI}$ to RI mapping

| $o_0^{RI}, o_1^{RI}$ | RI |
|---|---|
| 0, 0 | 1 |
| 0, 1 | 2 |
| 1, 0 | 3 |
| 1, 1 | 4 |

If the RI feedback consists of $3 \leq O^{RI} \leq 11$ bits of information as a result of the aggregation of RI bits corresponding to multiple DL component carriers (e.g., $[o_0^{RI}\ o_1^{RI}, \ldots, o_{O^{Rich}-1}^{RI}]$), then a coded bit sequence $[\tilde{q}_0^{RI}\ \tilde{q}_1^{RI}, \ldots, \tilde{q}_{31}^{RI}]$ is obtained by using the bit sequence $[o_0^{RI}\ o_1^{RI}, \ldots, o_{O^{Rich}-1}^{RI}]$ as the input to the channel coding block, as described in section 5.2.2.6.4 of REF2.

The "x" and "y" in TABLES 6 and 7 and the pseudo-code below are placeholders for scrambling the RI bits in a way that maximizes the Euclidean distance of the modulation symbols carrying rank information, as described in REF2.

For embodiments where the RI feedback consists of one or two bits of information, the bit sequence $q_0^{RI}, q_1^{RI}, q_2^{RI}, \ldots, q_{Q_{RI}-1}^{RI}$ is obtained by concatenation of multiple encoded RI blocks where $Q_{RI}$ is the total number of coded bits for all the encoded RI blocks. The last concatenation of the encoded RI block may be partial so that the total bit sequence length is equal to $Q_{RI}$.

The vector sequence output of the channel coding for the rank information is denoted by $\underline{q}_0^{RI}, \underline{q}_1^{RI}, \ldots, \underline{q}_{Q''_{RI}-1}^{RI}$ where $Q''_{RI} = Q_{RI}/(Q_m \cdot N_L)$. The vector sequence output may be obtained according to the following pseudo-code:

Set i, k to 0 while i<$Q_{RI}$ $\underline{q}_k^{RI} = [q_i^{RI} \ldots q_{i+Q_m \cdot N_L - 1}^{RI}]_T$ $i = i + Q_m \cdot N_L$ $k = k+1$ end while where $N_L$ is the number of layers onto which the UL-SCH transport block (TB) is mapped.

The proposed method for HARQ-ACK and RI coding in REF8, which is also described above, can be summarized as in the following.

Step 1: HARQ-ACK and RI feedback consisting of $3 \leq O^{ACK} \leq 11$ bits are encoded with (32, O) Reed-Muller (RM) code defined in section 5.2.2.6.4 in REF2.

Step 2: The coded bit sequence of length 32 generated by the RM code is partitioned into sixteen (16) groups of two consecutive bits, and for each group, a bit sequence having a length of $Q_m$ is generated, where the first two bits are the same as the two consecutive bits in the group and the remaining bits are filled with filler bits, so that outermost constellation points of modulation mapping of order $Q_m$ is always used. In this situation, a modulation symbol for HARQ-ACK and RI to be mapped to each resource element contains only two coded bits.

The number of modulation symbols to be used for HARQ-ACK and RI in each layer in a MIMO PUSCH are determined by the following equation:

$$Q' = \min\left\{\left\lceil\frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}}\right\rceil, 4 \cdot M_{sc}^{PUSCH}\right\}.$$

The number of modulation symbols to be used for HARQ-ACK and RI in each layer, Q', determined by the previous equation becomes small (e.g., 3), when the two MCS (modulation and coding scheme) numbers of the MIMO PUSCH transmission are large, which is the case when the channel condition is good between a mobile station and a base station.

When the method of HARQ-ACK and RI coding proposed in REF8 is used together with the Q' equation, the number of transmitted coded bits for HARQ-ACK and RI is 2Q'.

However, it is well-known that the minimum distance of the (32, O) RM code when keeping only a small number of bits (e.g., 10 bits) and puncturing a large number of bits (e.g., 22 bits) from the 32 coded bits, is close to zero. In such cases, the HARQ-ACK and RI feedback cannot be reliably decoded at the decoder.

To resolve this issue, embodiments of the present disclosure provide at least $Q_{min}$ number of REs for HARQ-ACK and RI, when the RM channel coding is used. For example, $Q_{min}$=10 REs. Here, $Q_{min}$ may depend on the payload of HARQ-ACK and RI.

In one embodiment of the present disclosure, the number of REs to be used for HARQ-ACK (or RI) feedback on a PUSCH transmission is determined as a function of the payload of the HARQ-ACK (or RI) feedback.

In particular, the number of REs, identified as Q', to be used for HARQ-ACK and RI is determined by one equation when the payload O is within a first range, and determined by another equation when the payload O is within a second range. When the payload O is within the second range, it is ensured that the number of REs Q' to be used for HARQ-ACK and RI is at least a fixed number, which is denoted by $Q_{min}$.

In some embodiments, the payload O within the first range is encoded by a first channel encoder, and the payload O within the second range is encoded by a second channel encoder.

In some embodiments, the number $Q_{min}$ is determined as a function of at least one of the payload O; the total number $L_{PUSCH}$ of transmission layers in the MIMO PUSCH; the number of transmission layers L(1) in CW0 (or for TB1); the number of bits $Q_{m1}, Q_{m2}$ to be mapped to a modulation symbol for CW1 ($Q_{m1}$) and for CW2 ($Q_{m2}$); and the number of transmission layers in CW1 (or for TB2). In one example, $Q_{min}$ is determined such that the effective code rate for HARQ-ACK (or RI) is at most a constant rate, r, where 0<r<1. In one particular example, r=0.5. In this example, $Q_{min}$ is a function of payload O and the code rate r. In another example, $Q_{min}$ is determined such that the effective code rates for HARQ-ACK (or RI) mapped to both codewords are at most a constant rate, r, where 0<r<1.

Determination of the Number of REs for HARQ-ACK and RI

In an embodiment of the present disclosure, if the payload O for HARQ-ACK and RI is either one (1) or two (2), the number of REs used for HARQ-ACK and RI feedback is determined according to the following equation:

$$Q' = \min\left\{\left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right\}.$$

If the payload for HARQ-ACK and RI is greater than two (2) but less than twelve (12), the number of REs used for HARQ-ACK and RI is determined according to the following equation:

$$Q' = \max\left\{\min\left\{\left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right\}, Q_{min}\right\}.$$

Here, it is ensured that the number of REs for HARQ-ACK and RI is at least $Q_{min}$ REs.

Another way to express the above equation is through the following two equations:

$$Q' = \max\{\min\{Q'_{temp}, 4 \cdot M_{sc}^{PUSCH}\}, Q_{min}\}$$

where $$Q'_{temp} = \left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil.$$

The first of the two equations above determines Q' based on a temporary value $Q'_{temp}$. The temporary value $Q'_{temp}$ is determined according to the second equation.

This embodiment will now be described in more detail. The following reflects proposed amendments to REF8.

When the mobile station transmits the HARQ-ACK bits or rank indicator bits, the mobile station determines the number of coded modulation symbols Q' for HARQ-ACK or rank indicator according to the following equation:

$$Q' = \min\left\{\left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right\}$$

where O is the number of HARQ-ACK bits or rank indicator bits, $M_{sc}^{PUSCH}$ is the scheduled bandwidth for PUSCH transmission in the current sub-frame for the transport block (expressed as a number of subcarriers in REF2), and $N_{symb}^{PUSCH-initial}$ is the number of SC-FDMA symbols per subframe for initial PUSCH transmission for the same transport block given by $$N_{symb}^{PUSCH-initial} = (2 \cdot (N_{symb}^{UL} - 1) - N_{SRS}),$$

where $N_{SRS}$ is equal to 1 if the mobile station is configured to send the PUSCH and SRS in the same subframe for initial transmission or if the PUSCH resource allocation for initial transmission even partially overlaps with the cell-specific SRS subframe and bandwidth configuration defined in section 5.5.3 of REF2. Otherwise $N_{SRS}$ is equal to 0. $M_{sc}^{PUSCH-initial}$, C, and $K_r^{(x)}$, x={0,1} are obtained from the initial PDCCH for the same transport block. If there is no initial PDCCH with DCI format 0 or 4 for the same transport block, $M_{sc}^{PUSCH-initial}$, C, and $K_r^{(x)}$, x={0,1} are determined according to one of the following two options:

the most recent semi-persistent scheduling assignment PDCCH, when the initial PUSCH for the same transport block is semi-persistently scheduled; or the random access response grant for the same transport block, when the PUSCH is initiated by the random access response grant.

If HARQ-ACK feedback consists of 1 or 2 bit information, then $Q_{ACK} = Q_m \cdot Q'$ and $[\beta_{offset}^{PUSCH} = \beta_{offset}^{HARQ-ACK}]$.

Otherwise, if HARQ-ACK feedback consists of more than two (2) bits but less than twelve (12) bits of information, then $Q_{ACK} = Q_m \cdot \max(Q', Q_{min})$ and $[\beta_{offset}^{PUSCH} = \beta_{offset}^{HARQ-ACK}]$, Herein, $\beta_{offset}^{HARQ-ACK}$ is determined according to the description in REF3.

If the rank indication feedback consists of one (1) or two (2) bits of information, $Q_{RI} = Q_m \cdot Q'$ and $[\beta_{offset}^{PUSCH} = \beta_{offset}^{RI}]$.

If the rank indication feedback consists of more than two (2) bits but less than twelve (12) bits of information, $Q_{RI} = Q_m \cdot \max(Q', Q_{min})$ and $[\beta_{offset}^{PUSCH} = \beta_{offset}^{RI}]$.

Herein, $\beta_{offset}^{RI}$ is determined according to the description in REF3.

Determination of $Q_{min}$ when Corner Constellation Mapping of a QAM Modulation is used for HARQ-ACK (or RI)

In another embodiment of the present disclosure, the modulation scheme used for HARQ-ACK (or RI) is determined by selecting four (4) outermost points in a quadrature amplitude modulation (QAM) constellation (e.g., QPSK, 16 QAM, or 64 QAM). This modulation scheme is also referred to as corner constellation mapping. In this embodiment, two coded bits are mapped to one QAM symbol in a QAM constellation. To ensure a code rate r when the QAM modulation scheme is used, the number of coded bits should be greater than O/r. Therefore, the number of modulation symbols (or the number of REs for HARQ-ACK or RI) should be greater than O/(2r).

When the same number of coded bits are replicated, modulated and mapped onto each of the transmission layers on a MIMO PUSCH, the minimum number of REs for the HARQ-ACK (or RI) feedback for each layer is determined to be $Q_{min}(O,r) = O/(2r)$. For example, when r=0.5, $Q_{min} = O$.

When differently coded bits (e.g., coded bits with different redundancy versions) are modulated and mapped onto each of the $L_{PUSCH}$ transmission layers on a MIMO PUSCH, the minimum number of REs for the HARQ-ACK (or RI) feedback for each layer is determined to be $Q_{min}(O,r,L_{PUSCH}) = O/(2rL_{PUSCH})$. For example, when r=0.5, $Q_{min} = O/L_{PUSCH}$.

Determination of $Q_{min}$ when a Normal QAM Modulation is Used for HARQ-ACK (or RI)

In another embodiment of the present disclosure, a quadrature amplitude modulation (e.g., QPSK, 16 QAM, or 64

QAM) is used for a modulation scheme for HARQ-ACK (or RI). In this embodiment, $Q_m$ coded bits are mapped to one QAM symbol, where $Q_m=2, 4,$ or 6 for QPSK, 16 QAM, or 64 QAM modulations, respectively. To ensure a code rate r when the modulation scheme is used, the number of coded bits should be greater than O/r. Therefore, the number of modulation symbols (or the number of REs for HARQ-ACK or RI) should be greater than $O/(Q_m r)$.

When $Q_{m1}$ and $Q_{m2}$ are the modulation orders for CW0 (or TB1) and CW1 (or TB2), respectively, the modulation order $Q'_m$ to determine $Q_{min}$ is determined as a function of $Q_{m1}$ and $Q_{m2}$.

In one example, $Q'_m=\max(Q_{m1}, Q_{m2})$. In this example, it is ensured that at least one of the two code rates for HARQ-ACK or RI mapped to the two CWs is less than r.

In another example, $Q'_m=\min(Q_{m1}, Q_{m2})$. In this example, it is ensured that both two code rates for HARQ-ACK or RI mapped to the two CWs are less than r.

In another example, $Q'_m=(Q_{m1}+Q_{m2})/2$. In this example, it is ensured that an average code rate for HARQ-ACK or RI mapped to the two CWs is less than r.

The following example equations may be used to determine the minimum number of REs for the HARQ-ACK (or RI) feedback for each layer:

$Q_{min}=\text{ceiling}(O/(Q'_m r))$. By using this equation, it is ensured that the code rate r is not exceeded. In a specific example where r=0.5, this equation becomes $$Q_{min}=\text{ceiling}(2O/Q'_m).$$

$Q_{min}=\text{ceiling}(\beta_{offset}^{PUSCH} O/(Q'_m r))$. By using this equation, it is ensured that the code rate r is not exceeded by a predetermined margin.

$Q_{min}=\text{ceiling}(O/(Q'_m c))$, where c is a higher-layer signaled code rate (e.g., c=0.5, 0.4, 0.3, or 0.2). By using this equation, the code rate not to be exceeded is higher-layer signaled.

$Q_{min}=\text{ceiling}(\beta_{offset}^{PUSCH}O/(Q'_m c))$, where c is higher-layer offset signaled, and c=1, 1.5, 2, for example.

$Q_{min}=\text{ceiling}(A/(Q'_m))$, where A is the maximum number of coded bits generated by an (A, O) block code. For example, when the LTE (32, O) code described above is used, A=32. By using this equation, it is ensured that the smallest number of coded symbols to be transmitted for HARQ-ACK and RI is at least A.

In some embodiments, differently coded symbols (i.e., symbols with different redundancy versions) are transmitted on the $L_{PUSCH}$ transmission layers on a MIMO PUSCH (i.e., transmission rank on the MIMO PUSCH=$L_{PUSCH}$).

If both CWs are to use the same modulation for HARQ-ACK (or RI), then the minimum number of REs for HARQ-ACK (or RI) feedback for each layer is set to be $Q_{min}(O,r, Q_m, L_{PUSCH})=O/(Q_m r L_{PUSCH})$. When r=0.5 and 16 QAM modulation is used for both CWs' HARQ-ACK, for example, $Q_{min}=O/(2 L_{PUSCH})$.

If each CW is to use a different modulation for HARQ-ACK (or RI), then the minimum number of REs for HARQ-ACK (or RI) feedback for each layer is set to be $Q_{min}(O,r, Q_{m1}, Q_{m2}, L(1), L(2))=O/(r (Q_{m1}L(1)+Q_{m2}L(2)))$. When r=0.5 and 16 QAM modulation is used for CW0 and 64 QAM modulation is used for CW1, for example, $Q_{min}=O/(r(4L(1)+6L(2)))$.

Repetition of HARQ-ACK and RI Before Channel Coding

In an embodiment of the present disclosure, the HARQ-ACK payload (or RI payload) to be piggybacked on a MIMO PUSCH is provided as an input to two independent coding steps for two TBs, TB1 and TB2, to be transmitted on the MIMO PUSCH, as shown in FIG. 7. The HARQ-ACK channel coding block (or RI channel coding block) in the coding steps for TB1 (denoted by channel coding block 1) may generate different HARQ-ACK coded bits (or RI coded bits) from the coding block in the coding steps for TB2 (denoted by channel coding block 2). In particular, the coded bits generated by channel coding block 1 can have a different redundancy version from the coded bits generated by channel coding block 2.

In some systems, coded bits are replicated across layers. Thus, when the number of HARQ-ACK REs assigned for each layer is small, the code rate is determined by $O/Q_mQ'$, when a QAM modulation that maps $Q_m$ coded bits to one modulation symbol is used. In contrast, the methods of the present disclosure can generate differently coded bits in the layers. Thus, the code rate can be as low as $O/Q_mQ' L_{PUSCH}$, where $L_{PUSCH}$ is the total number of transmission layers across two TBs (or CWs) in a MIMO PUSCH. Analysis shows that the methods of the present disclosure are more robust than prior art method in preventing zero-minimum distance error situations.

Figure 8A:
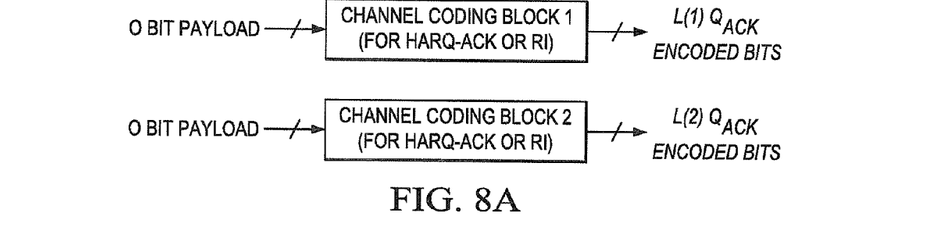
FIGS. 8A through 8C illustrate methods for channel coding according to embodiments of the present disclosure.
Figure 8B:
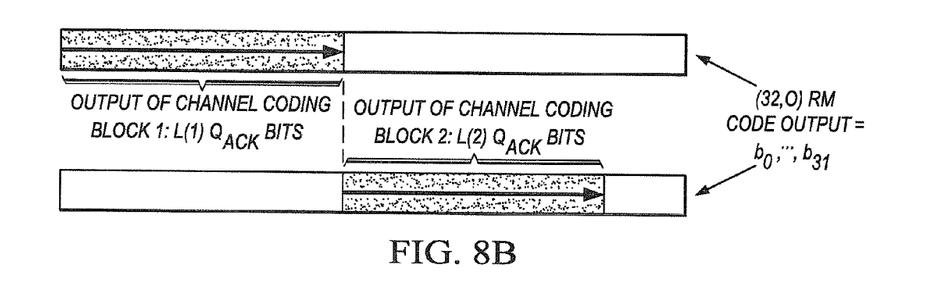
Figure 8C:
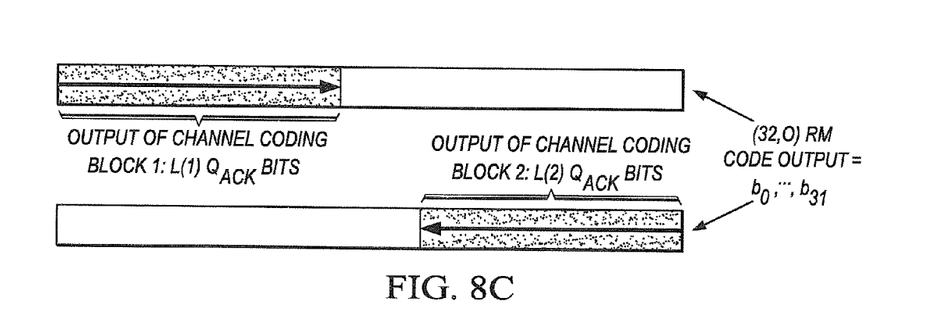

FIGS. 8A through 8C illustrate methods for channel coding according to embodiments of the present disclosure. FIG. 8A illustrates the inputs and outputs of channel coding blocks 1 and 2. As shown in FIG. 8A, the input for channel coding blocks 1 and 2 is the O-bit HARQ-ACK payload (or RI payload). The output for channel coding blocks 1 and 2 is $L(p)Q_{ACK}$ coded bits, where $Q_{ACK}$ is the number of HARQ-ACK (or RI) coded bits to be mapped to each layer, and $L(p)$ is the total number of layers in a codeword carrying TB p. $Q_{ACK}$ is determined by a function of a modulation scheme and the number of REs used for HARQ-ACK (or RI) feedback on the PUSCH, as described in the following examples.

In one example, the modulation scheme used for HARQ-ACK (or RI) is determined by selecting four (4) outermost points in a quadrature amplitude modulation (QAM) constellation (e.g., QPSK, 16 QAM, or 64 QAM). In this example, two coded bits are mapped to one QAM symbol in a QAM constellation. In this example, $Q_{ACK}=2Q'_{ACK}$, where $Q'_{ACK}$ is the number of REs to carry HARQ-ACK (or RI) feedback in each layer on the MIMO PUSCH.

In another example, a quadrature amplitude modulation (e.g., QPSK, 16 QAM, or 64 QAM) is used for a modulation scheme for HARQ-ACK (or RI). In this example, $Q_m$ coded bits are mapped to one QAM symbol, where $Q_m=2, 4,$ or 6 for QPSK, 16 QAM, or 64 QAM modulations, respectively. In this example, $Q_{ACK}=Q_mQ_{ACK}$, where $Q'_{ACK}$ is the number of REs to carry HARQ-ACK (or RI) in each layer on the MIMO PUSCH.

In an embodiment of the present disclosure, L(p) is determined by a CW-to-layer mapping method, as described in the following examples.

In one example, the number of transmission layers (or transmission rank) in a MIMO PUSCH is two (2). In this example, each TB is transmitted on each of the two layers: $L(1)=1, L2)=1$.

In another example, the number of transmission layers (or transmission rank) in a MIMO PUSCH is three (3). In this example, TB1 is transmitted on one of the three layers, while TB2 is transmitted on the other two layers: $L(1)=1, L(2)=2$.

In an embodiment of the present disclosure, when the HARQ-ACK payload (or RI payload), denoted by O, is greater than two (2) or less than twelve (12), the payload is encoded by the (32, O) Reed-Muller code, as shown in TABLE 2 above.

For both channel coding blocks 1 and 2, the encoded HARQ-ACK (or RI) block is denoted by $b_0, b_1, b_2, b_3, \ldots, b_{B-1}$ where B=32 and $$b_i = \sum_{n=0}^{O-1}(o_n \cdot M_{i,n}) \bmod 2$$

where i=0, 1, 2, ... B−1. Once the encoded HARQ-ACK (or RI) block is generated, channel coding blocks 1 and 2 generate different HARQ-ACK encoded bits (or RI encoded bits).

FIG. 8B illustrates one example of encoder outputs of Channel coding blocks 1 and 2. As shown in FIG. 8B, in channel coding block 1, the $L(1)Q_{ACK}$ HARQ-ACK encoded bits (or RI encoded bits) are obtained by circular repetition of encoded HARQ-ACK (or RI) blocks, starting from bit 0 ($b_0$). In other words, $$q_i = b_{(i \bmod B)}$$

where i=0, 1, 2, ..., $L(1)Q_{ACK}-1$.

In channel coding block 2, the $L(2)Q_{ACK}$ HARQ-ACK encoded bits (or RI encoded bits) are obtained by circular repetition of encoded HARQ-ACK (or RI) blocks, starting from bit $L(2)Q_{ACK}$ mod B. In other words, $$q_i = b_{((i+L(2)Q_{ACK}) \bmod B)}$$

where i=0, 1, 2, ..., $L(2)Q_{ACK}-1$.

FIG. 8C illustrates another example of encoder outputs of channel coding blocks 1 and 2. As shown in FIG. 8C, in channel coding block 1, the $L(1)Q_{ACK}$ HARQ-ACK encoded bits (or RI encoded bits) are obtained by circular repetition of encoded HARQ-ACK (or RI) blocks, starting from bit 0 ($b_0$). In other words, $$q_i = b_{(i \bmod B)}$$

where i=0, 1, 2, ..., $L(1)Q_{ACK}-1$.

In channel coding block 2, the $L(2)Q_{ACK}$ HARQ-ACK encoded bits (or RI encoded bits) are obtained by circular repetition of encoded HARQ-ACK (or RI) blocks, starting from the last bit in the HARQ-ACK (or RI block), which is $b_B$, and going backward to the first bit. In other words, $$q_i = b_{((B-i) \bmod B)}$$

where i=0, 1, 2, ..., $L(2)Q_{ACK}-1$.

In the example shown in FIG. 8C, a single unified equation can be written for the HARQ-ACK encoded bits (or RI encoded bits) obtained in channel coding blocks 1 and 2. For example, the output bit sequence $q_0, q_1, q_2, q_3, \ldots, q_{Q_{ACK}-1}$ may be obtained by circular repetition of the encoded HARQ-ACK block according to the following equation:

$$q_i = b_{(((p-1)(B-i)-(p-2)i) \bmod B)}$$

where i=0, 1, 2, ..., $L(p)Q_{ACK}-1$, and p∈{1,2} is the TB number (or TB index).

Alternatively, the output bit sequence $q_0, q_1, q_2, q_3, \ldots, q_{Q_{ACK}}-1$ may be obtained by circular repetition of the encoded HARQ-ACK block according to the following equation:

$$q_i = b_{((p'(B-i)-(p'-1)i) \bmod B)}$$

where i=0, 1, 2, ..., $L(p')Q_{ACK}-1$, and p'∈{0,1} is the CW number (or CW index).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, comprising:
 determining, in a subscriber station, a number of resource elements (REs) to be used for hybrid automatic repeat request acknowledgement (HARQ-ACK) or rank indication (RI) by:
 determining a number O of payload bits for the HARQ-ACK or RI,
 wherein, when the number O of payload bits is less than or equal to a first value of two bits, a minimum number $Q_{min}$ of the resource elements to be used for the HARQ-ACK or RI is the number O of payload bits, and
 wherein, when the number O of payload bits is greater than the first value but less than or equal to a second value, the minimum number $Q_{min}$ of resource elements to be used for the HARQ-ACK or RI is based on a ceiling function operating on a multiple of the number O of payload bits and a modulation order $Q'_m$ for a transport block including the HARQ-ACK or RI; and
 assigning, in the subscriber station, a number of REs for the HARQ-ACK or RI based upon the minimum number $Q_{min}$.

2. The method according to claim 1, wherein, when the number O of payload bits is greater than the first value but less than or equal to a second value, the minimum number $Q_{min}$ of resource elements to be used for the HARQ-ACK or RI is based on $$Q_{min} = \lceil 2O/Q'_m \rceil.$$

3. The method according to claim 2, wherein the minimum number $Q_{min}$ is the number O of payload bits when the number O of payload bits is equal to two bits.

4. The method according to claim 1, wherein the number of REs assigned for the HARQ-ACK or RI is based upon a maximum of at least a number Q' of coded modulation symbols and the minimum number $Q_{min}$.

5. The method according to claim 4, wherein the number of REs assigned for the HARQ-ACK or RI is based upon $$Q_{ACK} = Q_{RI} = Q_m \cdot \max(Q', Q_{min}),$$

where $Q_m$, bits are mapped to one symbol.

6. The method according to claim 1, wherein, when the number O of payload bits is greater than the first value but less than or equal to a second value, the minimum number $Q_{min}$ of resource elements to be used for the HARQ-ACK or RI is based on $$Q_{min} = \lceil O/Q'_m{}^r \rceil,$$

where r is 0.5.

7. The method according to claim 1, wherein, when the number O of payload bits is greater than the second value, the minimum number $Q_{min}$ of the resource elements to be used for HARQ-ACK or RI is based upon a minimum modulation order for the transport block including the HARQ-ACK or RI.

8. The method according to claim 7, wherein, when the number O of payload bits is greater than the second value, the minimum number $Q_{min}$ of the resource elements to be used for the HARQ-ACK or RI is based upon $$Q'_m = \min(Q_{m1}, Q_{m2}),$$

where $Q_{m1}$ and $Q_{m2}$ are modulation orders for first and second transport blocks.

9. A subscriber station, comprising:
 a transmitter configured to determine a number of resource elements (REs) to be used for hybrid automatic repeat request acknowledgement (HARQ-ACK) or rank indication (RI) by:

determining a number O of payload bits for the HARQ-ACK or RI, wherein, when the number O of payload bits is less than or equal to a first value of two bits, a minimum number $Q_{min}$ of the resource elements to be used for the HARQ-ACK or RI is the number O of payload bits, and wherein, when the number O of payload bits is greater than the first value but less than or equal to a second value, the minimum number $Q_{min}$ of resource elements to be used for the HARQ-ACK or RI is based on a ceiling function operating on a multiple of the number O of payload bits and a modulation order $Q'_m$ for a transport block including the HARQ-ACK or RI, and wherein the transmitter is configured to assign a number of REs for the HARQ-ACK or RI based upon the minimum number $Q_{min}$.

10. The subscriber station according to claim 9, wherein, when the number O of payload bits is greater than the first value but less than or equal to a second value, the minimum number $Q_{min}$ of resource elements to be used for the HARQ-ACK or RI is based on $$Q_{min} = \lceil 2O/Q'_m \rceil.$$

11. The subscriber station according to claim 10, wherein the minimum number $Q_{min}$ is the number O of payload bits when the number O of payload bits is equal to two bits.

12. The subscriber station according to claim 9, wherein the number of REs assigned for the HARQ-ACK or RI is based upon a maximum of at least a number Q' of coded modulation symbols and the minimum number $Q_{min}$.

13. The subscriber station according to claim 9, wherein the number of REs assigned for the HARQ-ACK or RI is based upon $$Q_{ACK} = Q_{RI} = Q_m \cdot \max(Q', Q_{min}),$$

where $Q_m$ bits are mapped to one symbol.

14. The subscriber station according to claim 9, wherein, when the number O of payload bits is greater than the first value but less than or equal to a second value, the minimum number $Q_{min}$ of resource elements to be used for the HARQ-ACK or RI is based on $$Q_{min} = \lceil O/Q'_m r \rceil,$$

where r is 0.5.

15. The subscriber station according to claim 9, wherein, when the number O of payload bits is greater than the second value, the minimum number $Q_{min}$ of the resource elements to be used for HARQ-ACK or RI is based upon a minimum modulation order for the transport block including the HARQ-ACK or RI.

16. The subscriber station according to claim 15, wherein, when the number O of payload bits is greater than the second value, the minimum number $Q_{min}$ of the resource elements to be used for the HARQ-ACK or RI is based upon $$Q'_m = \min(Q_{m1}, Q_{m2}),$$

where $Q_{m1}$ and $Q_{m2}$ are modulation orders for first and second transport blocks.

17. A method, comprising:
determining, in a base station, a number of resource elements (REs) used by a subscriber station for hybrid automatic repeat request acknowledgement (HARQ-ACK) or rank indication (RI), wherein the number of REs is based upon a number O of payload bits for the HARQ-ACK or RI, wherein, when the number O of payload bits is less than or equal to a first value of two bits, a minimum number $Q_{min}$ of the resource elements to be used for the HARQ-ACK or RI is the number O of payload bits, and wherein, when the number O of payload bits is greater than the first value but less than or equal to a second value, the minimum number $Q_{min}$ of resource elements to be used for the HARQ-ACK or RI is based on a ceiling function operating on a multiple of the number O of payload bits and a modulation order $Q'_m$ for a transport block including the HARQ-ACK or RI; and wherein the number of REs for the HARQ-ACK or RI is based upon the minimum number $Q_{min}$.

18. The method according to claim 17, wherein, when the number O of payload bits is greater than the first value but less than or equal to a second value, the minimum number $Q_{min}$ of resource elements to be used for the HARQ-ACK or RI is based on $$Q_{min} = \lceil 2O/Q'_m \rceil.$$

19. The method according to claim 17, wherein the minimum number $Q_{min}$ is the number O of payload bits when the number O of payload bits is equal to two bits.

20. The method according to claim 17, wherein the number of REs assigned for the HARQ-ACK or RI is based upon a maximum of at least a number Q' of coded modulation symbols and the minimum number $Q_{min}$.

21. The method according to claim 20, wherein the number of REs assigned for the HARQ-ACK or RI is based upon $$Q_{ACK} = Q_{RI} = Q_m \cdot \max(Q', Q_{min}),$$

where $Q_m$ bits are mapped to one symbol.

22. The method according to claim 17, wherein, when the number O of payload bits is greater than the first value but less than or equal to a second value, the minimum number $Q_{min}$ of resource elements used for the HARQ-ACK or RI is based on $$Q_{min} = \lceil O/Q'_m r \rceil,$$

where r 0.5.

23. The method according to claim 17, wherein, when the number O of payload bits is greater than the second value, the minimum number $Q_{min}$ of the resource elements used for HARQ-ACK or RI is based upon a minimum modulation order for the transport block including the HARQ-ACK or RI.

24. The method according to claim 23, wherein, when the number O of payload bits is greater than the second value, the minimum number $Q_{min}$ of the resource elements used for the HARQ-ACK or RI is based upon $$Q'_m = \min(Q_{m1}, Q_{m2}),$$

where $Q_{m1}$ and $Q_{m2}$ are modulation orders for first and second transport blocks.

25. A base station, comprising:
a receiver configured to determine a number of resource elements (REs) used by a subscriber station for hybrid automatic repeat request acknowledgement (HARQ-ACK) or rank indication (RI), wherein the number of REs is based upon a number O of payload bits for the HARQ-ACK or RI, wherein, when the number O of payload bits is less than or equal to a first value of two bits, a minimum number $Q_{min}$ of the resource elements to be used for the HARQ-ACK or RI is the number O of payload bits, and wherein, when the number O of payload bits is greater than the first value but less than or equal to a second value, the minimum number $Q_{min}$ of resource elements to be used for the HARQ-ACK or RI is based on a ceiling function operating on a multiple of the number O of payload bits and a modulation order $Q'_m$ for a transport block including the HARQ-ACK or RI; and wherein the number of REs for the HARQ-ACK or RI is based upon the minimum number $Q_{min}$.

26. The base station according to claim 25, wherein, when the number O of payload bits is greater than the first value but less than or equal to a second value, the minimum number $Q_{min}$ of resource elements to be used for the HARQ-ACK or RI is based on $$Q_{min}=\lceil 2O/Q'_m \rceil.$$

27. The base station according to claim 25, wherein the minimum number $Q_{min}$ is the number O of payload bits when the number O of payload bits is equal to two bits.

28. The base station according to claim 25, wherein the number of REs assigned for the HARQ-ACK or RI is based upon a maximum of at least a number Q' of coded modulation symbols and the minimum number $Q_{min}$.

29. The base station according to claim 28, wherein the number of REs assigned for the HARQ-ACK or RI is based upon $$Q_{ACK}=Q_{RI}=Q_m \cdot \max(Q', Q_{min}),$$

where $Q_m$ bits are mapped to one symbol.

30. The base station according to claim 25, wherein, when the number O of payload bits is greater than the first value but less than or equal to a second value, the minimum number $Q_{min}$ of resource elements used for the HARQ-ACK or RI is based on $$Q_{min}=\lceil O/Q'_m r \rceil,$$

where r 0.5.

31. The base station according to claim 25, wherein, when the number O of payload bits is greater than the second value, the minimum number $Q_{min}$ of the resource elements used for HARQ-ACK or RI is based upon a minimum modulation order for the transport block including the HARQ-ACK or RI.

32. The base station according to claim 31, wherein, when the number O of payload bits is greater than the second value, the minimum number $Q_{min}$ of the resource elements used for the HARQ-ACK or RI is based upon $$Q'_m=\min(Q_{m1}, Q_{m2}),$$

where $Q_{m1}$ and $Q_{m2}$ are modulation orders for first and second transport blocks.

\* \* \* \* \*